(12) United States Patent
Cheok et al.

(10) Patent No.: US 7,403,783 B2
(45) Date of Patent: Jul. 22, 2008

(54) NAVIGATION SYSTEM

(75) Inventors: Ka C. Cheok, Troy, MI (US); G. Edzko Smid, Troy, MI (US)

(73) Assignee: Jadi, Inc., Troy, MI (US)

( * ) Notice: Subject to any disclaimer, the term of this patent is extended or adjusted under 35 U.S.C. 154(b) by 70 days.

(21) Appl. No.: 11/059,911

(22) Filed: Feb. 17, 2005

(65) Prior Publication Data

US 2005/0215269 A1 Sep. 29, 2005

Related U.S. Application Data

(60) Provisional application No. 60/637,276, filed on Dec. 17, 2004, provisional application No. 60/615,121, filed on Oct. 1, 2004, provisional application No. 60/545,238, filed on Feb. 17, 2004.

(51) Int. Cl.
*H04Q 7/20* (2006.01)
(52) U.S. Cl. .................................. 455/456.1
(58) Field of Classification Search ............. 455/456.1, 455/456.2, 456.3, 456.5
See application file for complete search history.

(56) References Cited

U.S. PATENT DOCUMENTS

| | | | |
|---|---|---|---|
| 3,530,470 | A | 9/1970 | Sheftelman et al. |
| 4,136,394 | A | 1/1979 | Jones et al. |
| 4,229,737 | A | 10/1980 | Heldwein et al. |
| 4,799,062 | A | 1/1989 | Sanderford, Jr. et al. |
| 5,883,598 | A | 3/1999 | Parl et al. |
| 5,901,172 | A | 5/1999 | Fontana |
| 5,901,358 | A | 5/1999 | Petty et al. |
| 6,021,330 | A | 2/2000 | Vannucci |
| 6,054,950 | A | 4/2000 | Fontana |
| 6,101,391 | A | 8/2000 | Ishizuka et al. |
| 6,108,558 | A | 8/2000 | Vanderspool, II |
| 6,167,275 | A | 12/2000 | Oros et al. |
| 6,201,973 | B1 | 3/2001 | Kowaguchi |
| 6,239,741 | B1 | 5/2001 | Fontana et al. |
| 6,249,252 | B1 | 6/2001 | Dupray |
| 6,381,464 | B1 | 4/2002 | Vannucci |
| 6,405,047 | B1 | 6/2002 | Moon |

(Continued)

FOREIGN PATENT DOCUMENTS

EP 0 936 829 A2 8/1999

(Continued)

OTHER PUBLICATIONS

European Search Report dated Mar. 8, 2007, Application No. 05713670.7 -2220 (1214-001EP).

(Continued)

*Primary Examiner*—Naghmeh Mehrpour
(74) *Attorney, Agent, or Firm*—Dobrusin & Thennisch PC

(57) ABSTRACT

The present invention relates to a method of determining the location of a target. The method includes initializing a set of base stations to determine their location relative to each other. At the target, the time of arrival of at least one signal from each of the plurality of base stations Is measured. From this, the location of the target relative to the plurality of base stations may be directly calculated using a closed solution. In one embodiment, a time of arrival technique is used and in another embodiment a time difference of arrival technique is used. Preferably an ultra-wide band frequency is utilized.

27 Claims, 3 Drawing Sheets

U.S. PATENT DOCUMENTS

| | | | |
|---|---|---|---|
| 6,459,903 | B1 | 10/2002 | Lee |
| 6,473,619 | B1 | 10/2002 | Kong et al. |
| 6,477,379 | B2 | 11/2002 | Kingdon |
| 6,490,456 | B1 | 12/2002 | Bogdan et al. |
| 6,522,890 | B2 | 2/2003 | Drane et al. |
| 6,539,229 | B1 | 3/2003 | Ali |
| 6,556,832 | B1 * | 4/2003 | Soliman ................ 342/357.06 |
| 6,658,258 | B1 | 12/2003 | Chen et al. |
| 6,675,018 | B2 | 1/2004 | Villier et al. |
| 6,690,741 | B1 | 2/2004 | Larrick, Jr. et al. |
| 6,694,142 | B1 | 2/2004 | Kuwahara et al. |
| 6,700,533 | B1 | 3/2004 | Werb et al. |
| 6,812,884 | B2 | 11/2004 | Richley et al. |
| 6,882,315 | B2 | 4/2005 | Richley et al. |
| 6,941,144 | B2 * | 9/2005 | Stein ...................... 455/456.1 |
| 7,110,881 | B2 | 9/2006 | Gray et al. |
| 7,132,982 | B2 | 11/2006 | Smith et al. |
| 7,215,698 | B2 | 5/2007 | Darby et al. |
| 7,286,624 | B2 | 10/2007 | Woo et al. |
| 2001/0034223 | A1 | 10/2001 | Rieser et al. |
| 2001/0046869 | A1 | 11/2001 | Cedervall et al. |
| 2002/0034161 | A1 * | 3/2002 | Deneire et al. ............. 370/210 |
| 2002/0122003 | A1 | 9/2002 | Patwari et al. |
| 2002/0132623 | A1 | 9/2002 | Kingdon |
| 2002/0160787 | A1 | 10/2002 | Chen et al. |
| 2002/0183071 | A1 | 12/2002 | Shioda et al. |
| 2003/0008622 | A1 * | 1/2003 | Fernandez-Corbaton et al. ........................... 455/68 |
| 2003/0069026 | A1 | 4/2003 | Hoctor et al. |
| 2003/0096624 | A1 | 5/2003 | Ormson |
| 2003/0144006 | A1 | 7/2003 | Johansson et al. |
| 2003/0190920 | A1 | 10/2003 | An |
| 2005/0192024 | A1 * | 9/2005 | Sheynblat ................ 455/456.1 |
| 2005/0228613 | A1 | 10/2005 | Fullerton et al. |

FOREIGN PATENT DOCUMENTS

| | | |
|---|---|---|
| EP | 0 936 829 A3 | 5/2000 |
| EP | 1 292 043 A1 | 3/2003 |
| EP | 1292043 | 12/2003 |
| WO | WO 2005/081012 | 9/2005 |

OTHER PUBLICATIONS

International Search Report dated Apr. 25, 2005 for Serial No. PCT/US2005/004936.

Written Opinion of the International Searching Authority dated Apr. 25, 2005 for Serial No. PCT/US2005/004936.

International Preliminary Report on Patentability dated Jan. 1, 2006 for Serial No. PCT/US2005/004936.

* cited by examiner

NAVIGATION SYSTEM

CLAIM OF PRIORITY

The present application claims the benefit of provisional application Ser. No. 60/545,238, filed Feb. 17, 2004, Ser. No. 60/615,121, filed Oct. 1, 2004, and Ser. No. 60/637,276, filed Dec. 17, 2004, all of which are hereby incorporated by reference.

FIELD OF THE INVENTION

The present invention relates to the use of an ad hoc network during navigation and/or location. More particularly, the invention relates a system with three or more base stations, some of which are preferably mobile, that use explicit closed-form triangulation calculation to determine the location of a target.

BACKGROUND OF THE INVENTION

The Global Positioning System (GPS) is based on the fixed location base stations and the measurement of time-of-flight of accurately synchronized station signature transmissions. The base stations for the GPS are geo-stationary satellites and require atomic clocks for synchronization.

GPS has several draw backs including relatively weak signals that do not penetrate heavy ground cover and/or man made structures. Furthermore, the weak signals require a sensitive receiver. GPS also utilizes a single or narrow band of frequencies that are relatively easy to block or otherwise jam. The accuracy of the GPS system relies heavily on the use of atomic clocks, which are expensive to make and operate.

In addition, GPS utilizes a relatively slow update rate; on the order of once per second, which makes it ill suited for use in autonomous navigation of a vehicle. For example, a vehicle traveling at 10 kph would move about 2.75 m in a second. For an autonomous vehicle, significant changes in terrain may occur in this distance, making an update rate of once per second much too slow.

Known triangulation methods are also numerical in nature, meaning that no direct solution is available to find the location of the target. Rather, these open-form solutions provide only a initial guess and iterative numerical solution to estimate the location of the target. The resolution and accuracy of the location determination suffers accordingly. Further, using an open form solution in three dimensions is very difficult. There has not previously been a method to directly calculate the location of the target. Such a direct calculation would necessary increase the resolution and accuracy of the location determination.

The present invention overcomes one or more of these problems.

SUMMARY OF THE INVENTION

The present invention relates to methods of determining the location of a target unit (TU) in ad hoc, and preferably mobile, manner. The method includes initializing a network of at least three base stations (BS) to determine their relative location to each other in a coordinate system. The target then measures the time of difference arrival of at least one signal from each of three base stations. From the time difference of arrival of signals from the base stations, the location of the target on the coordinate system can be calculated directly. The invention further relates to components and system that embody the disclosed methods.

Overview. The ad hoc network discussed herein is a wireless radio network for determining a target location with high positioning accuracy and fast update rate. Such a network includes multiple base stations and at least one target unit, linked together with via high frequency ultra-wide bandwidth (UWB) wireless ranging and communication (RAC) transceivers and location schemes. The UWB RAC scheme ensures the desired accuracy in distance measurements and station identification. The location schemes employ fast direct closed-form solution for self-organizing local and global geographic (e.g. GPS) coordinate systems, and determining position of base stations and targets within the desired coordinate system.

Gigahertz UWB. The ad hoc network utilizes gigahertz UWB radio transceivers to provide ranging and communication information among base stations and targets.

UWB Methods. The UWB ranging and communication scheme may employ one or more of the following techniques: Time division multiple access (TDMA), frequency division multiple access (FDMA) or code division multiple access (CDMA). A direct sequence (DS)-CDMA scheme is a preferred UWB scheme for providing ranging resolution and identification of base stations and targets.

Chiprate & Resolution. The UWB RAC scheme preferably operates at giga-bits/sec (Gbits/s) chip rate and is capable of yielding centimeter resolution in range measurements at a rate of several thousand updates per second. For example, a range resolution of approximately 30 cm is achievable with a 1 Gbits/s chiprate; 3 cm resolution with 10 Gbits/s chiprate.

Over-sampling & Resolution. The invention also includes a method of employing high speed digital or analog over-sampling and signal processing to increase the resolution in the range measurements in the DS-CDMA scheme. For example, a 1 Gbits/s signal sampled at 10 Giga-samples per second (GS/s) and correlated at 10 GHz rate yields an 3 cm range resolution.

Radio Penetration. The high frequency UWB spectrum also penetrates through objects including buildings, ground cover, weather elements, etc., more readily than other narrower bandwidth signals such as the GPS. This makes UWB advantageous for non-line-of-sights, and less susceptible to multipath and canopy problems.

Distributed Power Spread Spectrum. The bandwidth of UWB signals may range from approx 100 MHz to 10 GHz or more, which means that the power of the signals may be distributed almost evenly over the wide spread spectrum. The power spectral density of UWB signals has similar appearance to that of a random noise spectrum, and hence, often makes the UWB signals undetectable or ambiguious. UWB signals thus have desirable low probability interference and low probability detection characteristics.

UWB versus Narrowband Disturbance. The wide spread spectrum also makes it difficult for signals with lesser bandwidth to corrupt the UWB signals. This would be a desirable characteristics in the case of on deliberate jamming by a narrowband broadcast or disturbances.

Non-ambiguous Station Identification. The ad hoc network utilizes base stations equiped with UWB tranceivers. The base stations communicate with each other and uniquely identify themselves. The identity is encoded with transmitted UWB signals. A base station correlates a received signal with the base station that sent it, and thus aleviating any ambiguity about the identity of transmission sources.

Self-Organization of Base Station Local & Global Coordinates. The base station locations in the ad hoc network may be fixed or mobile. The network will automatically establish the coordinates of the BS with respect to a local coordinate system. The network may be set up with BSs at desired locations in a matter of minutes. The network may also determine the global geographical coordinates by combining the local coordinates with GPS coordinates of base stations. Ad hoc network therefore provides both local & global coordinate frame references.

Target Unit Coordinates. The location of a target unit will be referenced to the local and/or global coordinate frames established for the base stations.

Time-of-Arrival (TOA). In a time-of-arrival (TOA) method, a target unit broadcasts a UWB transmission to the base stations. The TU then waits and receives returning UWB replies from each of the base stations. It clocks the time-of-arrivals of returning UWB replies and the clocked times are converted to the distances from the target to each of the base stations. A closed-form solution to the triangulation problem is used to ensure fast calculation of the location of the TU.

Time-Difference-of-Arrival (TDOA). In a time-difference-of-arrival (TDOA) method, the target unit only receives UWB tranmissions from the base stations; it does not transmit. A pre-arranged master base station broadcasts an initial UWB transmission to designated slave base stations & the target units. The slave BS then take turns to also transmit their own UWB signals to the TUs. The target clocks the time of arrivals of the transmission from the master and slave base stations. The known differences in the measured times of arrivals becomes the key inputs to the TDOA triangulation problem. This invention embodies a novel excplicitly expressed closed-form TDOA method that ensures fast calculation of the location of the target.

Advantageous. The main advantagous of the Ad hoc network are 1) the ad hoc & mobile manner in which the base stations may be rapidly set up, 2) the high precision in determining the location of a target, 3) the fast update rate of the location calculations, 4) the high penetration property desirable for non line-of-sight applications, 5) the higher tolerance to radio disturbances and resistant to jamming.

DETAILED DESCRIPTION

Figure 1:
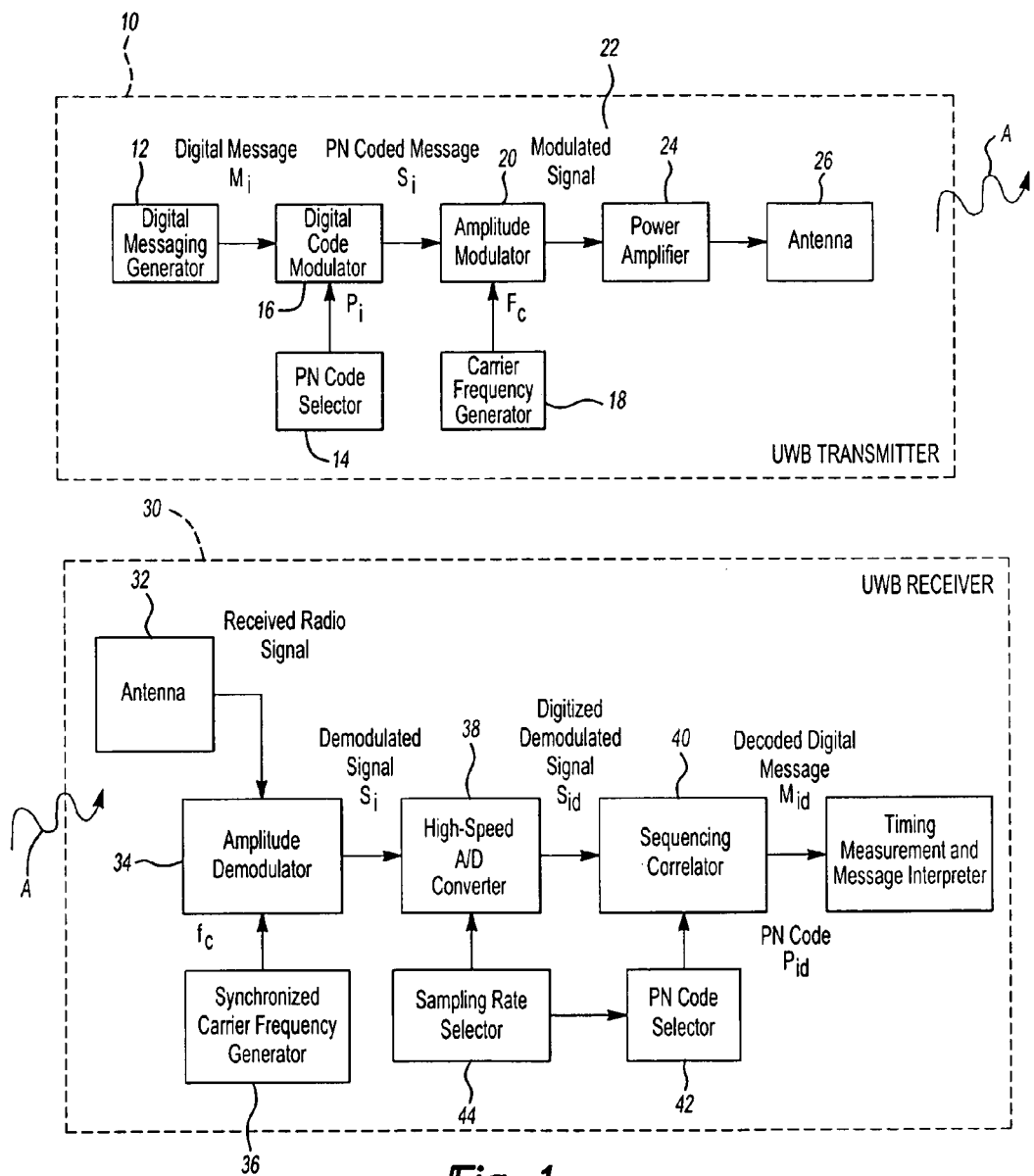
FIG. 1 illustrates the functional component of a UWB RAC transmission and receiving scheme.

The method of the present invention includes initializing a network of at least three base stations to determine their relative location to each other in a coordinate system; measuring, at the target, the time of arrival of at least one signal from each of three base stations, and then calculating the location of the target on the coordinate system can be calculated directly.

The initializing step utilizes at least three base stations and preferably at least four base stations. The base stations are transceivers that are capable of both receiving and transmitting signals. One of the base stations may be designated as the master station, as necessary. The master designation is arbitrary and may be shuttled amongst the base stations. In a preferred embodiment, the master designation resides on a single base station until that base station becomes deactivated (e.g. the base stations is powered down, loses communication with or travels out of range of the other base stations). The remaining base stations may be designated slave stations. Because the master designation is transferable among the slave stations, preferably each slave station is capable of acting as the master station.

The base stations, comprised of the master station and slave stations, may be stationary (whether permanently or temporarily) or mobile. Mobile base stations may be mounted to transportation vehicles such as automobiles, trains, boats, submarines, airplanes, helicopters, or the like. Base stations may also be mounted to non-transportation vehicles. Non-transportation vehicles include unmanned motorized vehicles. Non-transportation vehicles will typically be autonomous in that they are remotely controlled through wireline or wireless communication (e.g. an aerial drone or a mobile robot). Transportation vehicles used to house base stations may also be autonomous. Any suitable protocol may be used to communicate with an autonomous vehicle.

Mobile base stations may also be designed to be carried by an un-motorized vehicle, a pack animal or a human. As such, the base stations may be sized and shaped to be mounted to or contained within the desired transport, whether it is mounted to an automobile, carried by an aerial drone, carried in a backpack or built into a handheld unit. Preferably, the base stations are mounted to transportation vehicles. In a more preferred embodiment, at least one of the base stations is mounted to an autonomous vehicle.

The base stations may be stationary or in motion for any or all of the duration of the methods discussed below. Permanently fixed base stations may be suitable for certain applications; particularly where GPS is not suitable (e.g. within cities with tall building or within thick vegetation).

Due to the UWB frequency spectrum and thus its high penetration, placement of the base stations may not be critical. That is, the base stations and target may be non line-of-sight. Preferably, they should be placed such that the target remains within the volume circumscribed by the ranges of the base stations. While the distance between the base stations and the target is not critical, preferably the longest distance between a base station is less than about 100 KM, less than about 75 km, less than about 50 km, less than about 25 km, less than about 10 km, less than about 5 km, less than about 1 km or less than about 500 m. The signal power may suitably be selected to facilitate operation of the system any of these distances.

Each base station is capable of transmitting and receiving gigahertz high frequency UWB signals to communicate with other base stations and the target. The UWB signal is selected to reduce the interference from vegetative ground cover and from buildings, while also providing sufficient resolution in timing arrivals of signals. The UWB reduces problems associated with multi-path travel of signal because it tends to penetrate objects as opposed to being reflected. The high degree of penetration also means that the system incorporating UWB may be used successfully in non-line-of-sight applications, e.g. in urban settings or within a forest canopy. Furthermore, the UWB signals allow power of the signals to be spread over a gigahertz or more of frequency spectrum, thus making the signals very hard to detect, decode or jam. UWB signals may operate at the threshold of noise levels, meaning the signal's characteristics would look like those of sporadic noise to uninformed viewers. In broad terms, preferred carrier frequency for the UWB may be range from about 0.5 GHz to about 20 GHz, and the UWB may span between about zero and about 10 GHz.

To improve the accuracy of locations in the case where the target and the base stations are approximately in the same plane, at least one base station may be placed in a plane different than the remaining base stations. Further, additional base stations may be utilized to increase the accuracy of location determinations of the base stations and/or the target.

The initializing step uses either or both TOA or TDOA schemes to set up the network and determine the location the base stations, as discussed below.

Suitable targets include receivers as well as transceivers. A target acting in receiver-only mode are preferred over those acting in transceiver mode because a receiver does not broadcast information that may be used to reveal its location and is thus more secure. Because the base stations are also transceivers, a target that includes a transceiver may also act as a base station. Targets are primarily mobile, although they may stationary for a given period of time. Permanently fixed targets are not preferred, but may be suitable given the right circumstances, such as during research and development activities.

The targets may be housed in similar types of mobile and fixed units as the base stations. Besides transportation vehicles, preferred targets may be included with non-transportation vehicles, both autonomous and otherwise. Exemplary non-transportation vehicles include lawnmowers, land mine sweepers and aerial drones. Preferably, the targets are mounted to autonomous non-transportation vehicles that may be used for surveillance or security applications. Targets may also suitably be constructed into backpack devices or handheld units. Of course multiple targets may be located using a single group of base stations.

An example of a preferred target will be included on a land mine sweeper that includes devices to provide self-propelled movement to the sweeper (e.g. a motor and wheels or tracks), mine detection sensors (e.g. metal detector or imaging systems), mine deactivation capabilities, mine location designation capability (e.g. flag, paint, etc.), on-board computer for data storage, computation and communication, combinations thereof, or the like.

The components needed to implement the methods discussed herein may be incorporated into existing vehicles as an aftermarket add-on or incorporated by an original equipment manufacture or supplier into a vehicle during the build up of the vehicle.

Various information coding schemes may be used in the transmitted UWB signals to carry the desired information. A first suitable coding scheme is the time-division multiple access (TDMA) technique where a timing scheme in a UWB pulse packet represents the coded signals transmission. A second suitable coding scheme is the frequency-division multiple access (FDMA) technique where a select set of multiple bands of frequencies represents the coded transmission channel. A third suitable coding scheme is the code-division multiple access (CDMA) techniques where a pseudorandom number (PN) modulates and codes a signal to be transmitted. Typical TDMA, FDMA and CDMA coded signals have wide spectrums in hundreds of megahertz (MHz). UWB TDMA, FDMA and CDMA coded signals would have spectrums spread between about zero and about 10 GHz.

In addition to transmitting and receiving messages, a coded UWB signal can be timed to provide a measurement of the range between base stations and targets. The premise is based on the advent of extremely high speed electronics. For example, a 1 Gbits/s clock tick would translate to a flight of about 0.2997925 meter by the radio wave, and a 10 Gbits/s would clock with a resolution of about 0.03 m. The arrival times of UWB signals may be clocked using a correlator or matched filter techniques to measure the ranges between base stations and targets with suitable resolutions.

Although TDMA, FDMA and CDMA schemes may be timed for ranging purposes, a preferred embodiment is the UWB signal that utilize a direct sequence code division multiple access (DS-CDMA) communications technique to transmit information. In particular, DS-CDMA utilizes PN codes to identify each transmitter within a system (e.g. the base stations and/or the target). The PN code allows the receivers and transceivers within a system to simultaneously identify and decode the signals from multiple transmitters in the system. Each receiver/transceiver in the system uses a PN correlator to match PN codes to particular transmitters. Preferably, each receiver/transceiver has one PN correlator for each transmitter in the system.

This invention provides an additional preferred embodiment for improving resolution of the DS-CDMA ranging scheme by introducing high speed over-sampling of acquiring of coded signals. The PN correlators are designed to operate at a clock rate that is multiple times faster than the chiprate of the UWB signal. When a coded DS-CDMA signal is sampled at a rate faster than the chip rate of the PN correlator, a higher ranging resolution can be achieved. For example, if the PN correlator chip rate is about 1 Gbits/s, and the coded signal is digitally acquired at the about 1 Gbits/s, then the possible range resolution is about 0.3 meters. If the same signal is sampled and acquired at about 10 gigasamples/sec (GS/s), for example, then the range resolution can be improved to about 0.03 meters or 3 cm. This embodiment is described in detail a later section.

FIG. 1 illustrates a preferred embodiment of the functionality of the DS-CDMA transmitter and receivers utilized in the present invention. The transmitter 10 includes a digital message generator 12 which provides the message to be transmitted, $M_i$. A PN code selector 14 generates a PN code, $P_i$, that uniquely identifies the transmitter. A digital code modulator 16 modulates the message, Ms, by the PN code, $P_i$, to obtain a PN coded message, $S_i$. An RF carrier frequency, $f_c$, produced by carrier frequency generator 18 is combined with the message, $S_i$, at an amplitude modulator 20 to produce a modulated signal 22. The modulated signal is passed to a power amplifier 24 and then to an antenna 26 to be broadcast, as shown by arrow A.

The receiver 30 likewise includes an antenna 32 to receive the broadcast signal, as shown by arrow A. The receiver antenna passes the received signal to an amplitude demodulator 34. The demodulator uses a synchronized carrier frequency, $f_c$, from a synchronized carrier frequency generator 36 to demodulate and retrieve the PN coded message, $S_i$, from the received signal. Optionally, a high speed A/D converter 38 may be used to obtain a digitized demodulated signal, $S_{id}$. A sequence correlator 40 will be used to match the received digitized demodulated signal, $S_{id}$, to the PN code, $P_{id}$, stored in transmitter's own PN code selector 42. A sampling rate selector 44 may be used to in conjunction with A/D converter and/or the PN code selector. Matching the PN codes marks the arrival of the received signal and the time of correlation is marked. The time of arrival may then be stored for later use or passed directly to a message interpreter. In either case, the time of arrival may be used in the calculation of distances or locations, as discussed below.

UWB Ranging & Communication

Pseudo-random Number (PN) Code. The PN code, $P_i$, which could be tens to hundreds of bits long, is the code that identifies with a particular base station. To maximize distinctions in correlation and minimize cross-talk interference, Gold, Golay, Barker or Walsh codes may be used for the PN codes.

Digital message. The digital message $M_i$ may carry preamble, identification, message codes or any other desired information. In practice, $M_i$ could be tens to hundreds of bits long.

Figure 2:
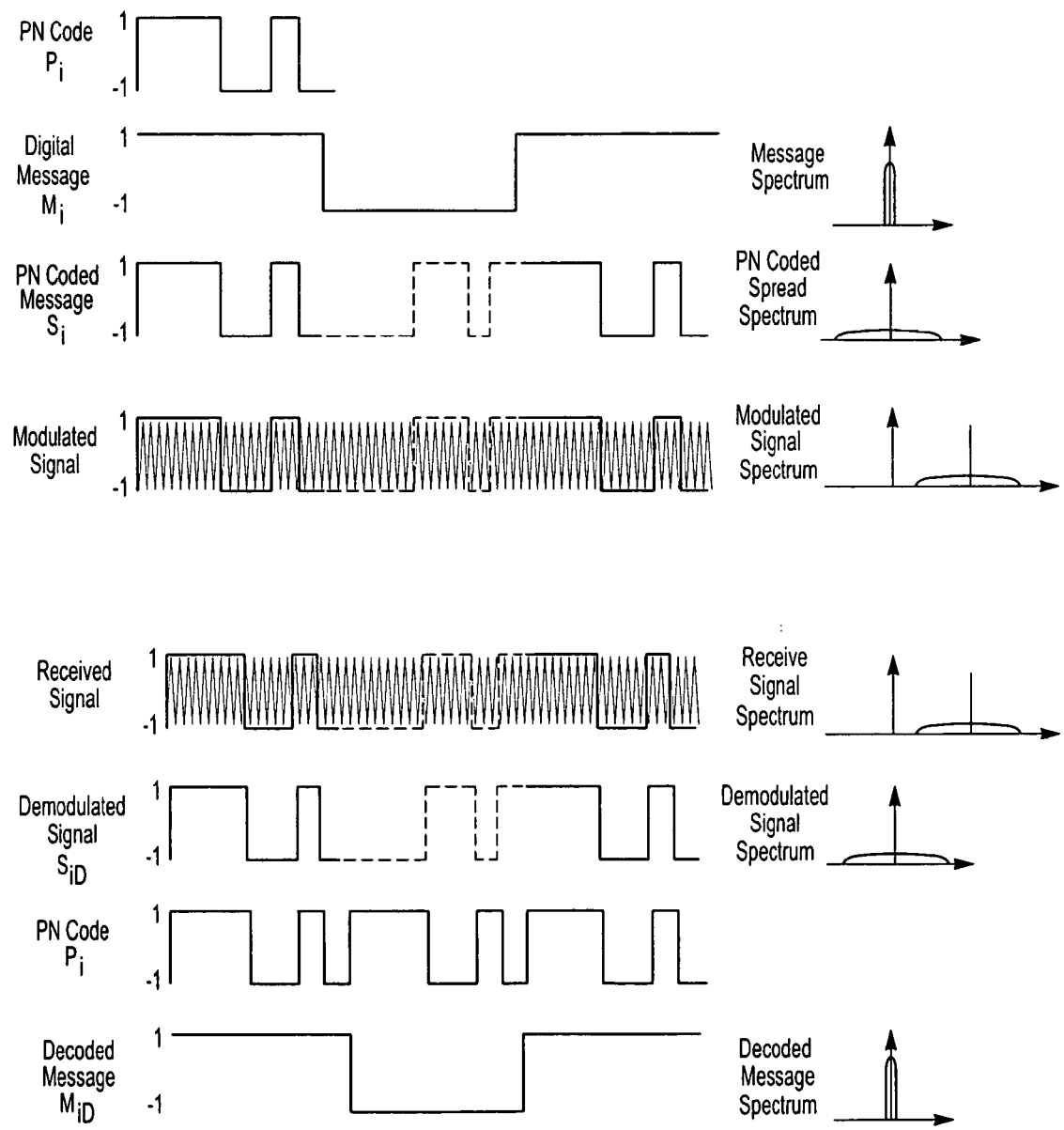
FIG. 2 illustrates an example of direct sequence CDMA with UWB signals.

Transmitter scheme. As an example, consider a digital message $M_i$=101 (+−+) and a PN code $P_i$=1110010 (+++−−+−), as shown in FIG. 2. Note that unipolar binary of "1" and "0" is converted to bipolar equivalence of "+" and "−". In the bipolar representation, a "0" would mean that there is no signal. The digital message $M_i$ modulates the amplitude of the PN code $P_i$. The PN coded message may be expressed as a Kronecker product of the digital message and the PN code; i.e., PN coded message $S_i$=kronecker($M_i$, $P_i$)=1110010 0001101 1110010 (+++−−+−−−−++−++++−−+−). The $S_i$ then amplitude modulates a carrier signal for transmission.

Example rate. As an example of the above scheme, consider a digital message $M_i$ with a baud rate of 70 Mbits/s modulating a PN code $P_i$ with a chiprate of 350 Mbits/s. The resultant PN coded signal $S_i$ with a chiprate of 350 Mbits/s is then upconverted to an amplitude modulated signal with about a 2.5 GHz carrier frequency for wireless transmission.

Spread spectrum. The narrow frequency spectrum of the digital message $M_i$ is spread into an ultra-wide bandwidth spectrum of the PN coded message $S_i$. The UWB spectrum is shifted and centered at the carrier frequency $f_c$ to achieve an ultra-wide bandwidth spectrum for the modulated signal.

Receiver scheme. The receiver receives the transmitted signal, and demodulates the received signal into an analog demodulated signal $S_{iD}$. A threshold or edge detection synch technique may be used to trigger conversion of the analog demodulated signal into a digital demodulated signal $S_{iD}$(kT), where t=kT, T being the sampling interval and k is the time index. The sampled digital signal $S_{iD}$(kT) may then be correlated with the PN code $P_i$ to produce a decoded message $M_{iD}$.

Direct sequence correlation. If the sampling rate is chosen to be the same as the PN chiprate of 350 Mbits/s, i.e., the sampling rate of 350 MSamples/s, then a direct sequence correlation between the sampled decoded signal $S_{iD}$(kT) and the PN code $P_i$ may be performed. The shift registers, denoted by $D^{-1}$ in the figure, clocked at T, and thus hold the record $S_{iD}$(kT−T), $S_{iD}$(kT−2T), . . . , $S_{iD}$(kT−6T). The sampled data {$S_{iD}$(kT−jT), j=0,1,2, . . . ,6} is multiplied by the reverse bits of PN code, i.e., {$P_i$(m), m=7,6,5, . . . ,1}. The sum of the product is the output of the filter. The matched filter produces a positive or negative peak value when there is a match between the shifted coded data and PN code.

Direct sequence correlation resolution. The time resolution T translates to a range resolution of CT, C being the speed of light. In the case, the sampling interval T=1/350M sec, and so the resolution in clocking the time of arrival is T=2.8571 ns which translates to a ranging resolution of about 0.8566 meter.

Over-sampling sequence correlation. Alternatively, a higher speed digital threshold sampler may be used; for example, consider a digital sampler with 1.75 GS/s (gigasamples/sec) which is chosen to be five times the chiprate of 350 Mbits/s. The digital samples are then correlated with the PN code constructed at a new chiprate of 1.75 Gbits/s. The oversampled sequence $S_{iD}$(kT), $S_{iD}$(kT−T/$n_O$), $S_{iD}$(kT−2T/$n_O$), . . . , $S_{iD}$(kT−($n_s$−1)T/$n_O$),$S_{iD}$(kT−T),$S_{iD}$(kT−($n_s$+1)T/$n_O$), etc is correlated with a stretched PN code $P_{i,7}$, 0, 0 . . . , 0, $P_{i,6}$, 0, etc, at T/$n_O$ second interval, where $n_s$ is the number of over-sampling. In this case, the matched outputs may occur at T/$n_O$ sampling time interval. Therefore, the new over-sampling configuration provides $n_s$ times more resolution than the previous direct configuration.

Over-sampling sequence correlation resolution. The time resolution T/$n_O$ translates to a range resolution of CT/$n_O$, C being the speed of light. Therefore using the higher speed sampler and correlator in this way produces higher resolution in timing arrivals of signals; in this case the oversampling resolution is $n_s$ finer than that of the direct sampling. For example, when $n_O$=5 is used, the shift registers are clocked at T/5 second. The matched filter therefore produces an output every T/5 second. In the oversampling case, the sampling interval T=1/1.75 G sec, and so the resolution in clocking the time of arrival is T=0.5714 ns, translating to a ranging resolution of about 0.1713 meter, which is five times (1.75 G/350 M) finer than 0.8566 meter, the case of direct sampling.

Over-sampling analog sequence correlation. Yet another alternative is the analog approach where the analog demodulated signal is sampled using a high-speed analog-to-digital converter (ADC); for example, an 8-bit ADC with a throughput of 1.75 GS/s. The sampled signal may then be correlated with the PN code constructed at a chiprate of 1.75 Gbits/s. The correlation decodes the sent message, yields higher resolution timing for arrivals of the signal, and also indicates the strength of received signal.

Time-of-Arrival & Time-Difference-of-Arrival Methods. Closed-form solutions for TOA and TDOA techniques are presented. Both techniques may be used for initializing the network of base stations to determine their relative locations of the base stations and for locating the target. Preferably a combination of the techniques is utilized in the overall system, with TOA utilized to initialize the base stations and TDOA to locate the target.

A TOA/TDOA Combination. In the embodiment described below, the relative locations of the base stations are determined through a TOA technique. These relative locations may optionally be combined with other information (e.g. GPS data) to provide global geographic locations. An explicitly expressed closed-form TDOA technique is then employed to calculate the location of the target.

Relative Locations of Base Stations

Designation of Base Stations. A preferred embodiment of the network uses four base stations designated as $BS_1$, $BS_2$, $BS_3$ & $BS_4$, with $BS_1$ arbitrarily selected as the master station. Additional base stations, $BS_5$, . . . , $BS_N$, may be readily appended.

TOA Range Measurement. To begin initializing the network, $BS_1$ will broadcast a UWB signal transmission to $BS_2$, $BS_3$ & $BS_4$. Upon receiving the signal, each base station waits for a predetermined time delay and replies with its own UWB signal transmission that identifies with the base station. $BS_1$ will clock the time-of-arrivals for the each of the replies from $BS_2$, $BS_3$ & $BS_4$ and record the total time-of-flight $T_{121}$, $T_{131}$ & $T_{141}$. As an a example, the total time-of-flight $T_{121}$ comprises: time-of-flight $T_{12}$ for the first signal transmission to go from $BS_1$ to $BS_2$; the delay $T_{D2}$ at $BS_2$; and $T_{21}$(=$T_{12}$), the time-of-flight for the reply transmission to go from $BS_2$ to $BS_1$. That is, $T_{121}$, =$T_{12}$+$T_{D2}$+$T_{21}$. Therefore the time of flight between $BS_1$ & $BS_2$ is $$T_{12} = \frac{(T_{121} - T_{D2})}{2}$$

and the distance between them is $l_{12}$=C $T_{12}$, where C=2.99792458×10$^8$ m/s is the speed of radio wave. The value of C used in this calculation may be changed to represent the change in the speed of light based on the ambient temperature, humidity and altitude.

The distances $l_{13}$ & $l_{14}$ between $BS_1$ & $BS_3$ and $BS_1$ & $BS_4$ can therefore similarly be determined using the TOA technique. Next, $BS_2$ will similarly broadcast its UWB signal transmission and clock the replies from $BS_3$ & $BS_4$. The distances from $BS_2$ to $BS_3$ and $BS_4$ are obtained as $l_{23}$ & $l_{24}$. Lastly, $BS_3$ will similarly broadcast its UWB signal transmission, clock the reply from $BS_4$, and calculate the distance $l_{34}$. This set of steps provides all the necessary information for determining the relative locations of the base stations.

In general, the TOA timing is given by $$T_{ij} = \frac{(T_{iji} - T_{Dj})}{2} \quad (1)$$

where time $T_{ij}$ for the radio transmission to go from $BS_i$ to $BS_j$, $T_{iji}$ is the total time-of-round trip flight and $T_{Dj}$ is the delay time at $BS_j$. The TOA range measurement is calculated from $$l_{ij} = C T_{ij} \quad (2)$$

C being the speed of radio wave propagation.

Local Coordinate Frame. The information obtained through the signal transmissions above may be utilized to determine location of the base stations on a local coordinate system. For convenience, a local Cartesian coordinate system is utilized, although other coordinate system may be appropriate:

$$\text{Let } \begin{bmatrix} x_1 \\ y_1 \\ z_1 \end{bmatrix}, \begin{bmatrix} x_2 \\ y_2 \\ z_2 \end{bmatrix}, \begin{bmatrix} x_3 \\ y_3 \\ z_3 \end{bmatrix} \& \begin{bmatrix} x_4 \\ y_4 \\ z_4 \end{bmatrix}$$

be the coordinates of the location of $BS_1$, $BS_2$, $BS_3$ & $BS_4$. The location of $BS_1$ is assigned to be the origin; i.e., $x_1=0$, $y_1=0$ & $z_1=0$. $BS_2$ is assigned to be located on the x-axis of the coordinate system; i.e., $x_2=l_{12}$, $y_2=0$ & $z_2=0$. Next, $BS_3$ is assigned to be located on the xy-plane of the coordinate system; i.e., $z_3=0$. This completes the definition of the local coordinate frame.

Coordinates of BS's. The location coordinates $x_3$, $y_3$, $x_4$, $y_4$ & $z_4$ of $BS_3$ and $BS_4$, remains to be determined. It may be shown that the distances and the coordinates are related by $$l_{13}^2 = x_3^2 = y_3^2$$

$$l_{14}^2 = x_4^2 = y_4^2 = z_4^2$$

$$l_{23}^2 = (l_{12} - x_3)^2 + y_3^2$$

$$l_{24}^2 = (l_{12} - x_4)^2 + y_4^2 + z_4^2$$

$$l_{34}^{2pl} = (x_3 - x_4)^2 + (y_3 - y_4)^2 + z_4^2$$

From this relationship, the desired coordinates is thus given by $$x_3 = \frac{l_{12}^2 + l_{13}^2 - l_{23}^2}{2 l_{12}} \quad (4)$$

-continued $$y_3 = (l_{13}^2 - x_3^2)^{1/2}$$

$$x_4 = \frac{l_{12}^2 + l_{14}^2 - l_{24}^2}{2 l_{12}}$$

$$y_4 = \frac{(x_3 - x_4)^2 + y_3^2 + l_{14}^2 - x_4^2}{2 y_3}$$

$$z_4 = (l_{34}^2 - (x_3 - x_4)^2 - (y_3 - y_4)^2)^{1/2}$$

This completes the determination of the local coordinates for $BS_i$, i=1, 2, 3 & 4.

Coordinates of additional BS's. The result is readily extended to additional $BS_i$, i=5, 6, . . . ,N, where N is the total number of base stations. The distances e $l_{1i}$, $l_{2i}$ & $l_{3i}$ from $BS_i$ to $BS_1$, $BS_2$ & $BS_3$ would be calculated on the TOA measurement technique already described above. By induction from equation (4), the coordinates of $BS_i$ would then be given by $$x_i = \frac{l_{12}^2 + l_{1i}^2 - l_{2i}^2}{2 l_{12}} \quad (5)$$

$$y_i = \frac{(x_3 - x_i)^2 + y_3^2 + l_{1i}^2 - x_i^2}{2 y_3} \quad i = 5, 6, \ldots, N$$

$$z_i = (l_{3i}^2 - (x_3 - x_i)^2 - (y_3 - y_i)^2)^{1/2}$$

Closed-form TOA method for local BS location. The formulas (1) & (2) are TOA range measurements from the signal transmission, which are then used in (4) & (5) to compute the coordinates of the base stations.

Kinematics. Global geographical locations of the base stations are related to the relative locations by a translation and rotation kinematic relationship as follows:

$$\begin{bmatrix} ^G x_i \\ ^G y_i \\ ^G z_i \end{bmatrix} = \begin{bmatrix} d_x \\ d_y \\ d_z \end{bmatrix} + \begin{bmatrix} e_{11} & e_{12} & e_{13} \\ e_{21} & e_{22} & e_{23} \\ e_{31} & e_{32} & e_{33} \end{bmatrix} \begin{bmatrix} x_i \\ y_i \\ z_i \end{bmatrix} \quad (6)$$

where $^G x_i$, $^G y_i$ & $^G z_i$ denote geographical coordinates, $d_x$, $d_y$ & $d_z$ are the translation parameters, $e_{ij}$, i=1,2,3, j=1,2,3 represent the rotation transformation parameters and $x_i$, $y_i$ & $z_i$ are the relative coordinates determined earlier. The geographical coordinates $^G x_i$, $^G y_i$ & $^G z_i$ correspond to what is generally known as longitude, latitude and height of a location, whereas $x_i$, $y_i$, & $z_i$, are the local relative coordinates obtained using the methods of UWB RAC & TOA measurements.

GPS data. The translation and rotation parameters may preferably be determined by placing GPS receivers on three of the base stations, although only a single GPS receiver is required. For explanation purposes, suppose that GPS antennas are installed as close as possible to the transceivers of $BS_1$, $BS_2$ & $BS_3$. The global geographical coordinates of these base stations may be accurately determined by using precision GPS, or by calculating statistical mean of less pre cise GPS data when they are stationary. They would be denoted by $$\begin{bmatrix} {}^G x_1 \\ {}^G y_1 \\ {}^G z_1 \end{bmatrix}, \begin{bmatrix} {}^G x_2 \\ {}^G y_2 \\ {}^G z_2 \end{bmatrix} \& \begin{bmatrix} {}^G x_3 \\ {}^G y_3 \\ {}^G z_3 \end{bmatrix}.$$

Translation parameters. It is readily seen that the translation parameters simply equate to the GPS coordinates of $BS_1$, which is the origin of the local coordinate frame; i.e., $$\begin{bmatrix} d_x \\ d_y \\ d_z \end{bmatrix} = \begin{bmatrix} {}^G x_1 \\ {}^G y_1 \\ {}^G z_1 \end{bmatrix} \quad (7)$$

Rotational parameters. The rotation transformation parameters must satisfy $$\begin{bmatrix} {}^G x_2 \\ {}^G y_2 \\ {}^G z_2 \end{bmatrix} = \begin{bmatrix} d_x \\ d_y \\ d_z \end{bmatrix} + \begin{bmatrix} e_{11} & e_{12} & e_{13} \\ e_{21} & e_{22} & e_{23} \\ e_{31} & e_{32} & e_{33} \end{bmatrix} \begin{bmatrix} l_{12} \\ 0 \\ 0 \end{bmatrix} \quad (8)$$

$$\begin{bmatrix} {}^G x_3 \\ {}^G y_3 \\ {}^G z_3 \end{bmatrix} = \begin{bmatrix} d_x \\ d_y \\ d_z \end{bmatrix} + \begin{bmatrix} e_{11} & e_{12} & e_{13} \\ e_{21} & e_{22} & e_{23} \\ e_{31} & e_{32} & e_{33} \end{bmatrix} \begin{bmatrix} x_3 \\ y_3 \\ 0 \end{bmatrix} \quad (9)$$

and $$\begin{bmatrix} e_{11} & e_{12} & e_{13} \\ e_{21} & e_{22} & e_{23} \\ e_{31} & e_{32} & e_{33} \end{bmatrix} \begin{bmatrix} e_{11} & e_{21} & e_{31} \\ e_{12} & e_{22} & e_{32} \\ e_{13} & e_{23} & e_{33} \end{bmatrix} = \begin{bmatrix} 1 & 0 & 0 \\ 0 & 1 & 0 \\ 0 & 0 & 1 \end{bmatrix} \quad (10)$$

where the first two equations come from the location relationships of $BS_2$ & $BS_3$ and the last equation is the ortho-normal property of the rotation transformation matrix. The individual rotation parameters are thus given by $e_{11} = ({}^G x_2 - d_x)/l_{12}$ $e_{21} = ({}^G y_2 - d_y)/l_{12}$ $e_{31} = ({}^G z_2 - d_z)/l_{12}$ $e_{12} = ({}^G x_3 - d_x - e_{11} x_3)/y_3$ $e_{22} = ({}^G y_3 - d_y - e_{21} x_3)/y_3$ $e_{32} = ({}^G z_3 - d_z - e_{31} x_3)/y_3$ $e_{13} = (1 - e_{11}^2 - e_{12}^2)^{1/2}$ $e_{23} = (1 - e_{21}^2 - e_{22}^2)^{1/2}$ $e_{33} = (1 - e_{31}^2 - e_{32}^2)^{1/2}$ Close-form method for global BS locations. The obtained translation and rotation parameters define a closed-form calculation for the desired transformation from the relative coordinates to the global geographical coordinates.

Local BS coordinates. Determining the location of the target may also be accomplished through the use of a TOA technique. The coordinate locations $$\begin{bmatrix} x_1 \\ y_1 \\ z_1 \end{bmatrix}, \begin{bmatrix} x_2 \\ y_2 \\ z_2 \end{bmatrix}, \ldots, \begin{bmatrix} x_N \\ y_N \\ z_N \end{bmatrix}$$

of base stations are known, as determined from above.

Local TU coordinates. Let $$\begin{bmatrix} x \\ y \\ z \end{bmatrix}$$

be the coordinate location of the target with these coordinates to be determined.

TOA Range Measurements. In the TOA technique, the target has a transmitter & receivers to broadcast and receive signals from various base stations. The same TOA distance measurement method described above is applicable for determining the distance from a target to the base stations. The target broadcasts a UWB signal transmission, and waits for the replies from the base stations. For explanation purposes, consider the situation of the base stations: $BS_1, BS_2, \ldots, BS_N$ where $r_1, r_2, \ldots, r_N$ are the distances from the target to each of the base stations, respectively.

TOA Location Problem. The distance measurements are related to the coordinates of the target and the base stations as follows:

$$r_1^2 = (x - x_1)^2 + (y - y_1)^2 + (z - z_1)^2 \quad (12)$$

$$r_2^2 = (x - x_2)^2 + (y - y_2)^2 + (z - z_2)^2$$

$$\vdots$$

$$r_N^2 = (x - x_N)^2 + (y - y_N)^2 + (z - z_N)^2$$

Expansion of the polynomial terms yields:

$$r_1^2 = x^2 - 2xx_1 + x_1^2 + y^2 - 2yy_1 + y_1^2 + z^2 - 2zz_1 + z_1^2 \quad (13)$$

$$r_2^2 = x^2 - 2xx_2 + x_2^2 + y^2 - 2yy_2 + y_2^2 + z^2 - 2zz_2 + z_2^2$$

$$\vdots$$

$$r_N^2 = x^2 - 2xx_N + x_N^2 + y^2 - 2yy_N + y_N^2 + z^2 - 2zz_N + z_N^2$$

The goal is to compute the location x, y & z of the target from the above relationship.

Closed-form TOA method for TU location. Manipulating the expanded equations, it can be shown that the coordinates of the target is given by $$\begin{bmatrix} x \\ y \\ z \end{bmatrix} = \frac{1}{2} \begin{bmatrix} (x_2 - x_1) & (y_2 - y_1) & (z_2 - z_1) \\ (x_3 - x_2) & (y_3 - y_2) & (z_3 - z_2) \\ \vdots & \vdots & \vdots \\ (x_1 - x_N) & (y_1 - y_N) & (z_1 - z_N) \end{bmatrix}^{\#} \quad (14)$$

-continued $$\begin{bmatrix} (x_2^2 - x_1^2) + (y_2^2 - y_1^2) + (z_2^2 - z_1^2) - (r_2^2 - r_1^2) \\ (x_3^2 - x_2^2) + (y_3^2 - y_2^2) + (z_3^2 - z_2^2) - (r_3^2 - r_2^2) \\ \vdots \\ (x_1^2 - x_N^2) + (y_1^2 - y_N^2) + (z_1^2 - z_N^2) - (r_1^2 - r_N^2) \end{bmatrix}$$

where $[\ ]^\#$ denotes a generalized Penrose pseudo-inverse of the matrix. This is the closed-form calculation for the local target coordinates based on a TOA technique.

Necessary condition. For N=3, the pseudo-inverse is the standard matrix inverse, i.e., $[\ ]^\# = [\ ]^{-1}$, For N>3, the pseudo-inverse is defined $[\ ]^\# = ([\ ]^T [\ ])^{-1} [\ ]^T$, where $[\ ]^T$ denotes the matrix transpose. From the necessary condition of algebra, a solution for x, y & z exists only for cases where N≧3 and all the BS's are located at distinct locations. Therefore, the minimum number of base stations required to determine the location x, y & z of the target is 3. In practice, at least 4 base stations are desirable.

Figure 3:
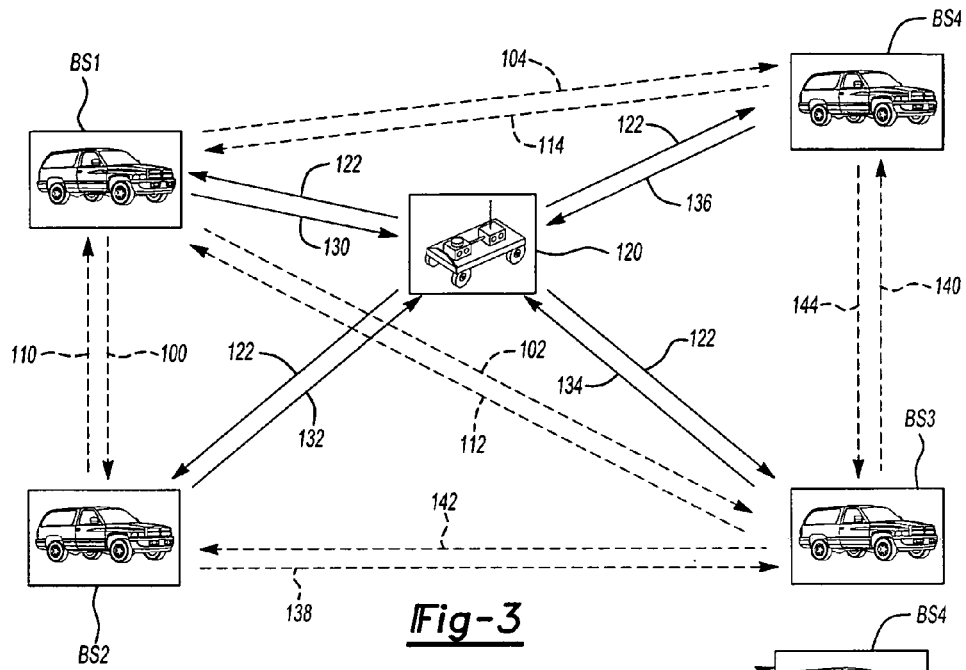
FIG. 3 illustrates a self-organizing scheme for establishing local & global coordinate system utilizing four base stations.

Summary of TOA method. FIG. 3 illustrates a TOA technique for locating the base stations and the target. First, the base stations are initialized. Base station 1, $BS_1$, acts as the master station and sends a signal 100, 102 and 104 to each of the slave stations, $BS_2$, $BS_3$ and $BS_4$. After a delay, each slave station sends a signal 110, 112 and 114 to the master station. The delay for each slave station is known to the master station. Slave stations also receive signals broadcast by other slave stations and rebroadcast those signal after the delay, as shown with signals 138 and 140 broadcast by $BS_2$ and $BS_3$, respectively, and rebroadcast as signals 142 and 144 by $BS_3$ and $BS_4$, respectively. The length of time for the signal round trip provides the distances between the base stations and their location through the calculation discussed above. After initialization, the target 120 sends a signal 122 which is received by each of the base stations. After a delay known to the target, the each base station sends a signal 130, 132, 134 and 136 to the target. Upon arrival at the target, the target can calculate its position through the calculation discussed above.

TDOA Method. Alternatively, determining the location of the target may also be accomplished through the use of a TDOA technique. Use of the TDOA technique is preferred, particularly when increased security is desired because the target need only have the capability to receive signals. By not transmitting signals, the target cannot reveal its location. In the TDOA method, the $$\begin{bmatrix} x_1 \\ y_1 \\ z_1 \end{bmatrix}, \begin{bmatrix} x_2 \\ y_2 \\ z_2 \end{bmatrix}, \ldots, \begin{bmatrix} x_N \\ y_N \\ z_N \end{bmatrix}$$

coordinates of base stations locations are known and $$\begin{bmatrix} x \\ y \\ z \end{bmatrix}$$

is the target with these coordinates to be determined.

TDOA Ranging Scheme. In the TDOA technique, the target need only receive signals and does not need to transmit signal, although it may do so. The designated master station $BS_1$ initiates and broadcasts a UWB signal transmission at time $T_0$, unknown to other base stations and target. Upon receiving the broadcast signal, each base station, $BS_i$, i=1, 2, ..., N waits for a predetermined time delay $T_{Di}$ and replies with its own UWB transmission signal that identifies the particular base station. The target will clock the arrival of the signals from each base stations as $T_i$, i=1, 2, ..., N.

TDOA Location Problem. The TDOA problem is to compute x, y & z from knowing the coordinates $$\begin{bmatrix} x_1 \\ y_1 \\ z_1 \end{bmatrix}, \begin{bmatrix} x_2 \\ y_2 \\ z_2 \end{bmatrix}, \ldots, \begin{bmatrix} x_N \\ y_N \\ z_N \end{bmatrix}$$

of base stations locations and the time measurements $T_i$, i=1, 2, ..., N.

TDOA Relative Distance Measurements. As before, let $r_1$, $r_2$, ..., $r_N$ are the distances from the target to $BS_i$, i=1, 2, ..., N, respectively, and $l_{12}, l_{13}, \ldots, l_{1N}$ from $BS_1$ to $BS_2$, $BS_3$, ..., $BS_N$. It is readily shown that the time-differences between the arrival times, $T_i$, i=1, 2, ..., N, translate to:

$$C(T_1 - T_0) = r_1 \qquad (15)$$

$$C(T_2 - T_0) = l_{12} + CT_{D2} + r_2$$

$$\vdots$$

$$C(T_N - T_0) = l_{1N} + CT_{DN} + r_N$$

where C is the speed of light at a given temperature. The unknown variables in the above equation are $T_0, r_1, r_2, \ldots, r_N$.

Range difference. Define the differences in the ranges, $\Delta r i1$, between the $BS_i$, i=2, ... N, and $BS_i$ as:

$$\Delta r_{i,1} = r_i - r_1, \; i=2, \ldots, N \qquad (16)$$

From the above relationship, it is seen that the distances between the target and the base stations may be represented as:

$$\Delta r_{i,1} = C(T_i - T_1 - T_{Di}) - l_{1i}, \; i=2, \ldots, N \qquad (17)$$

which may be computed based on predetermined parameters, $T_{Di}$ & $l_{1i}$ and measured time-difference of arrivals (TDOA) $T_i - T_1$. The computed measured quantity $\Delta r_{i,1}$ in (17) will be used in the TDOA method for calculating the location of the target.

Manipulation toward linear relationship (First key simplification). The geometric relationships are nonlinear in nature and are difficult to solve. A key contribution here is to reduce the nonlinear relationships into linear relationships by eliminating nonlinear terms. Note that squaring this formula results in:

$$\Delta r_{i,1}^2 = r_i^2 + r_1^2 - 2 r_i r_1 \qquad (18)$$

with a cross product term of $r_i r_1$. Also note that multiplying $\Delta r_{i,1}$ and $r_i$ also produces the cross term $r_i r_1$, as shown in:

$$\Delta r_{i,1} r_i = r_i r_1 - r_1^2 \qquad (19)$$

Next note that following combination of $\Delta r_{i,1}^2$ & $\Delta r_{i,1} r_1$ eliminates the cross term $r_i r_1$:

$$\Delta r_{i,1}^2 + 2\Delta r_{i,1} r_1 = r_i^2 - r_1^2 \quad (20)$$
$$= (x - x_i)^2 + (y - y_i)^2 + (z - z_i)^2 -$$
$$(x - x_1)^2 + (y - y_1)^2 + (z - z_1)^2$$
$$= x^2 - 2xx_i + x_i^2 + y^2 - 2yy_i + y_i^2 + z^2 -$$
$$2zz_i + z_i^2 - (x^2 - 2xx_1 + x_1^2 + y^2 -$$
$$2yy_1 + y_1^2 + z^2 - 2zz_1 + z_1^2)$$
$$= x_i^2 + y_i^2 + z_i^2 - (x_1^2 + y_1^2 + z_1^2) -$$
$$2(x_i - x_1)x - 2(y_i - y_1)y - 2(z_i - z_1)z$$

A compact form for the above expression may be written as $$\Delta r_{i,1}^2 + 2\Delta r_{i,1} r_1 = h_i^2 h_1^2 - 2\Delta x_{i,1} x - 2\Delta y_{i,1} y - 2\Delta z_{i,1} z \quad (21)$$

where $$h_i^2 = x_i^2 + y_i^2 + y_i^2$$
$$\Delta x_{i,1} = x_i - x_1$$
$$\Delta y_{i,1} = y_i - y_1$$
$$\Delta z_{i,1} = z_i - z_1$$

Linear relationships. The above manipulation results in a set of algebraic equations which is linear in x, y & z and $r_1$. Matrices may be used to solve these linear equations.

$$\begin{bmatrix} \Delta x_{2,1} & \Delta y_{2,1} & \Delta z_{2,1} \\ \Delta x_{3,1} & \Delta y_{3,1} & \Delta z_{3,1} \\ \vdots & \vdots & \vdots \\ \Delta x_{N,1} & \Delta y_{N,1} & \Delta z_{N,1} \end{bmatrix} \begin{bmatrix} x \\ y \\ z \end{bmatrix} = \frac{1}{2}\begin{bmatrix} h_2^2 - h_1^2 - \Delta r_{2,1}^2 \\ h_3^2 - h_1^2 - \Delta r_{3,1}^2 \\ \vdots \\ h_N^2 - h_1^2 - \Delta r_{N,1}^2 \end{bmatrix} + \begin{bmatrix} -\Delta r_{2,1} \\ -\Delta r_{3,1} \\ \vdots \\ -\Delta r_{N,1} \end{bmatrix} r_1 \quad (22)$$

Least square error (LSE) estimate of x, y & z The location x, y & z of the target is expressed in terms of $r_1$ as:

$$\begin{bmatrix} x \\ y \\ z \end{bmatrix} = \begin{bmatrix} \Delta x_{2,1} & \Delta y_{2,1} & \Delta z_{2,1} \\ \Delta x_{3,1} & \Delta y_{3,1} & \Delta z_{3,1} \\ \vdots & \vdots & \vdots \\ \Delta x_{N,1} & \Delta y_{N,1} & \Delta z_{N,1} \end{bmatrix}^{\#} \begin{bmatrix} -\Delta r_{2,1} \\ -\Delta r_{3,1} \\ \vdots \\ -\Delta r_{N,1} \end{bmatrix} r_1 + \quad (23)$$

$$\frac{1}{2}\begin{bmatrix} \Delta x_{2,1} & \Delta y_{2,1} & \Delta z_{2,1} \\ \Delta x_{3,1} & \Delta y_{3,1} & \Delta z_{3,1} \\ \vdots & \vdots & \vdots \\ \Delta x_{N,1} & \Delta y_{N,1} & \Delta z_{N,1} \end{bmatrix}^{\#} \begin{bmatrix} h_2^2 - h_1^2 - \Delta r_{2,1}^2 \\ h_3^2 - h_1^2 - \Delta r_{3,1}^2 \\ \vdots \\ h_N^2 - h_1^2 - \Delta r_{N,1}^2 \end{bmatrix} = \begin{bmatrix} a_x r_1 + b_x \\ a_y r_1 + b_y \\ a_z r_1 + b_z \end{bmatrix}$$

where:

$$\begin{bmatrix} a_x \\ a_y \\ a_z \end{bmatrix} = \begin{bmatrix} \Delta x_{2,1} & \Delta y_{2,1} & \Delta z_{2,1} \\ \Delta x_{3,1} & \Delta y_{3,1} & \Delta z_{3,1} \\ \vdots & \vdots & \vdots \\ \Delta x_{N,1} & \Delta y_{N,1} & \Delta z_{N,1} \end{bmatrix}^{\#} \begin{bmatrix} -\Delta r_{2,1} \\ -\Delta r_{3,1} \\ \vdots \\ -\Delta r_{N,1} \end{bmatrix}$$

$$\begin{bmatrix} b_x \\ b_y \\ b_z \end{bmatrix} = \frac{1}{2}\begin{bmatrix} \Delta x_{2,1} & \Delta y_{2,1} & \Delta z_{2,1} \\ \Delta x_{3,1} & \Delta y_{3,1} & \Delta z_{3,1} \\ \vdots & \vdots & \vdots \\ \Delta x_{N,1} & \Delta y_{N,1} & \Delta z_{N,1} \end{bmatrix}^{\#} \begin{bmatrix} h_2^2 - h_1^2 - \Delta r_{2,1}^2 \\ h_3^2 - h_1^2 - \Delta r_{3,1}^2 \\ \vdots \\ h_N^2 - h_1^2 - \Delta r_{N,1}^2 \end{bmatrix}$$

Necessary condition. The necessary condition for pseudo-inverse formulation in (23) to yield a unique solution is to have $N \geq 4$. This means that the TDOA method would require a minimum of four base stations to determine the location x, y & z of the target. In practice, more than 4 base stations are desirable.

Manipulation to quadratic form (Second key simplification). Expand the Euclidean distance relationship to yield another expression relating x, y & z and $r_1$.

$$r_1^2 = (x - x_1)^2 + (y - y_1)^2 + (z - z_1)^2 \quad (24)$$
$$= x^2 + y^2 + z^2 + x_1^2 + y_1^2 + z_1^2 - 2xx_1 - 2yy_1 - 2zz_1$$

Substituting the LSE relationship into the Euclidean relationship yields:

$$r_1^2 = (a_x r_1 + b_x)^2 + (a_y r_1 + b_y)^2 + (a_z r_1 = b_z)^2 - 2(a_x r_1 + b_x)x_1 - 2(a_y r_1 + b_y)y_1 - 2(a_z r_1 + b_z)z_1 + x_1^2 + y_1^2 + z_1^2 \quad (25)$$

This essentially is a quadratic polynomial equation of the form:

$$(a_x^2 + a_y^2 + a_z^2 - 1)r_1^2 - 2(a_x(x_1 - b_x) + a_y(y_1 - b_y) + a_z(z_1 - b_z))r_1 + (x_1 - b_x)^2 + (y_1 - b_y)^2 + (z_1 - b_z)^2 = 0 \quad (26)$$

Calculation of $r_1$. The polynomial equation may be expressed more compactly as $$ar_1^2 + br_1 + c = 0 \quad (27)$$

where $$a = a_x^2 + a_y^2 + a_z^2 - 1$$
$$b = -2(a_x(x_1 - b_x) + a_y(y_1 - b_y) + a_z(z_1 - b_z))$$
$$c = (x_1 - b_x)^2 + (y_1 - b_y)^2 + (z_1 - b_z)^2$$

The quadratic polynomial yields two answers for $r_1$.

$$r_1 = \frac{-b \pm \sqrt{b^2 - 4ac}}{2a} \quad (28)$$

Calculation of x, y & z. Selecting the positive answer for $r_1$ and compute the location of target as:

$$\begin{bmatrix} x \\ y \\ z \end{bmatrix} = \begin{bmatrix} a_x \\ a_y \\ a_z \end{bmatrix} r_1 + \begin{bmatrix} b_x \\ b_y \\ b_z \end{bmatrix} \quad (29)$$

Closed-form TDOA method for TU location. Formulas (17), (21), (23), (27), (28) & (29) define the explicit closed-form TDOA method for calculating the location of the target. The direct measure-and-calculate TDOA formulas enhance speed in processing. They represent a key embodiment of the invention.

Existing Approaches to TDOA Location Problem. It is noted that existing approaches to the TDOA problem have been limited to numerical approximation techniques such as the Taylor series nonlinear least squares iterative method. The method starts by guessing the location of the target, linearizing the nonlinear hyperbolic functions for the TDOA relationship, and using the least squares estimation technique to compute a new estimate of the target position. The process is repeated until the solution converges to a location. The approach is therefore indirect and lengthy, and may not converge to a true solution.

Figure 4:
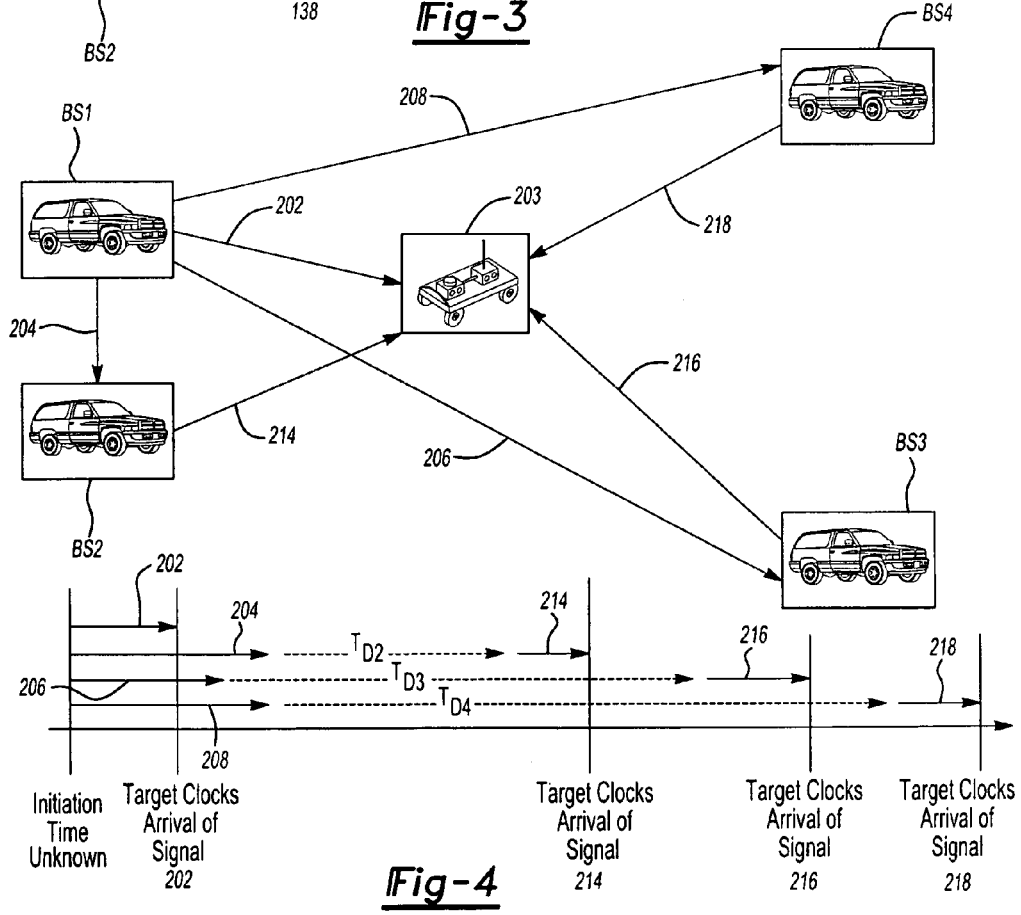
FIG. 4 illustrates a TDOA UWB RAC scheme for locating the target utilizing four base stations

Summary of TDOA method. FIG. 4 illustrates a TDOA technique for locating the target. The positions of the base stations are known from the information gathered using the TOA method. The master station BS, broadcasts a signal 202 to the target 203; the same broadcast signal 204, 206 and 208 are also received by the slave stations $BS_2$, $BS_3$ and $BS_4$. The slave stations wait a set delay, $T_{D2}$, $T_{D3}$, $T_{D4}$, and re-send the signals 214, 216 and 218 to the target. Based on the difference in arrival times of each of the signals 202, 214, 216 and 218, the target can determine its own position according to the calculation discussed above. A schematic depiction of the arrival times of is shown at the bottom of FIG. 4.

Ranging & Positioning Errors. Accuracy in the measurement of ranges depends on several factors including hardware clock & delays, transmission model, etc. Each measured range can be expressed as the sum of its true range and its measurement error, i.e., $r_{1+\Delta r1}$, $i=1,\ldots,N$. The position of the target can also be similarly expressed as $x+\Delta x$, $y+\Delta y$ & $z+\Delta z$, where $\Delta x$, $\Delta y$ & $\Delta z$ are the calculation errors. It follows from the least squares estimate formula (14) that the calculation errors are related to the measurements errors as $$\begin{bmatrix} \Delta x \\ \Delta y \\ \Delta z \end{bmatrix} = \underbrace{\begin{bmatrix} (x_2-x_1) & (y_2-y_1) & (z_2-z_1) \\ (x_3-x_2) & (y_3-y_2) & (z_3-z_2) \\ \vdots & \vdots & \vdots \\ (x_1-x_N) & (y_1-y_N) & (z_1-z_N) \end{bmatrix}^{\#} \begin{bmatrix} r_1 & -r_2 & \ldots & 0 \\ 0 & r_2 & -r_3 & \vdots \\ \vdots & \vdots & \ddots & \\ -r_1 & 0 & \ldots & r_N \end{bmatrix}}_{C} \quad (30)$$

$$\begin{bmatrix} \Delta r_1 \\ \Delta r_2 \\ \vdots \\ \Delta r_N \end{bmatrix} = C \begin{bmatrix} \Delta r_1 \\ \Delta r_2 \\ \vdots \\ \Delta r_N \end{bmatrix}$$

Positioning accuracy. Assuming the average measurement errors are zero, the covariance of the measurement errors can be expressed as $$Q_r = \text{average of } \left\{ \begin{bmatrix} \Delta r_1 \\ \Delta r_2 \\ \vdots \\ \Delta r_N \end{bmatrix} [\Delta r_1 \; \Delta r_2 \; \ldots \; \Delta r_N] \right\} \quad (31)$$

The covariance of the errors in calculation of the position x, y & z, is similarly defined as $$Q_r = \text{average of } \left\{ \begin{bmatrix} \Delta x \\ \Delta y \\ \Delta z \end{bmatrix} [\Delta x \; \Delta y \; \Delta z] \right\} \quad (32)$$

Then it follows from (30) that the covariance of the position errors is related to the measurement errors by $$Q_z = C Q_r C^T \quad (33)$$

Formula (33) defines the resolution or accuracy in the calculation of the position in terms of covariance $Q_x$. The standard deviations of the resolution is given by $|\sqrt{Q_x}|$, which is the square root of the covariance. The variance depends on the matrix C, which relies on the locations of base stations ($x_i$'s, $y_i$'s & $z_i$'s) and their ranges ($r_i$'s) to the target. That is, positioning accuracy depends on the configuration of BS's location and the current position of the target. As discussed above, by placing one base station or the target out of the plane of the remaining base stations, the accuracy can be increased.

Illustration of Ranging & Positioning Accuracy. In practice, UWB RAC equipment will be tested and calibrated via experiments and correlating it with known measurements. Therefore well calibrated equipment can be as accurate in calibration as its ranging resolution. Referring to a prior example, a 350 Mbits/s chiprate UWB signal could be oversampled at a rate of 1.75 Gbits/s (five times the chiprate), so that the PN correlation yield a ranging resolution of about 0.1713 meter. For example, the resolution can be treated as the standard deviation; and its covariance would be 0.02934 $m^2$. Since each UWB RAC receivers are independent, the ranging covariance $Q_r$ becomes a diagonal matrix with 0.02934 as elements. The positioning accuracy is then reflected in the positioning covariance $Q_x = C Q_r C^T$, where C depends $x_i$'s, $y_i$'s & $z_i$'s and $r_i$'s. For example, let the $\{x_i, y_i, z_i\}$ of the $BS_i$, $i=1,\ldots,5$, be located at ad hoc network coordinates of $\{0, 0, 0\}$, $\{1000, 0, 0\}$, $\{1000, 1000, 0\}$, $\{0\ 1000, 1000\}$ & $\{1000, 1000, 1000\}$, with the coordinates represents meters from the origin. Let the target be located at $\{400\ 500\ 600\}$, such that $\{r_i\}$ is $\{877.50\}$, $\{984.89\}$ $\{984.89\}$, $\{754.98\}$ & $\{877.50\}$. Then the position error covariance results in $$Q_x = C Q_r C^T = \begin{bmatrix} 0.0226 & -0.0142 & 0.0142 \\ -0.0142 & 0.0569 & -0.0427 \\ 0.0142 & -0.04270 & 0.0511 \end{bmatrix}$$

The standard deviations in the position errors $\{\Delta x, \Delta y, \Delta z\}$ can be deduced from the square roots of the diagonal elements of $Q_x$ as $\{0.150, 0.239, 0.226\}$ meters, which typify the possible accuracy in the position calculation. Note that accuracy is improved if higher over-sampling rate is employed. For example, the position error standard deviations would reduce to $\{0.015, 0.024, 0.023\}$ meters, when an over-sampling rate of 17.5 Gbits/s is used.

Update Rate. The update rate for the UWB RAC TOA/TDOA methods depends on the distances between the stations and target, and the performance of computing equipment. The update rate (updates/second) can be estimated from $$F_{Update} = \left(1 + \sum_{i=1}^{N}(i-1)\right) N T_{FlightMax} + T_{Processing}$$

where $T_{FlightMax}$ is the maximum flight time between stations/targets, and $T_{Processing}$ is the electronics and computation time. For an operation area spreading over 1 km using current technology, an estimate of the update rate is at least about 200 location update per second is possible. Of course, slower update rates may also be used to suitably meet the practical requirements of any base station or target. For example update rates of about 25 times/sec, about 50 times/sec, about 100, times/sec, about 150 times/sec and rates between these rates may be suitable.

It will be further appreciated that functions or structures of a plurality of components or steps may be combined into a single component or step, or the functions or structures of one-step or component may be split among plural steps or components. The present invention contemplates all of these combinations. Unless stated otherwise, dimensions and geometries of the various structures depicted herein are not intended to be restrictive of the invention, and other dimensions or geometries are possible. Plural structural components or steps may be provided by a single integrated structure or step. Alternatively, a single integrated structure or step might be divided into separate plural components or steps. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes.

What is claimed is:

1. A method of determining the location of a target, comprising:
   initializing a plurality of base stations to determine their relative location to each other wherein, during initializing, a first base station of the plurality of base stations sends a UWB signal to a second base station and a third base station of the plurality of base stations to determine a distance between the first base station and the second base station and a distance between the first base station and the third base station and wherein the second base station sends a UWB signal to the third base station to determine a distance between the second base station and the third base station;
   measuring, at the target, the time of arrival of at least one UWB signal from each of the plurality of base stations;
   calculating directly the location of the target relative to the plurality of base stations, where the plurality of base stations is at least three when a time of arrival technique is used and wherein the plurality of base stations is at least four when a time difference of arrival technique is used.

2. The method of claim 1, wherein the target calculates it own position.

3. The method of claim 1, wherein each of the base stations is a mobile base station.

4. The method of claim 1, wherein the initializing step comprises using a time of arrival technique to determine the location of each base station.

5. The method of claim 1, further comprising initializing at least one of the plurality of base stations to determine the global geographic location of each of the plurality of base stations.

6. The method of claim 1, wherein the measuring and calculating steps are repeated at least 50 times a sec.

7. The method of claim 6, wherein the measuring and calculating steps are repeated at least 200 times a sec.

8. The method of claim 1, wherein the calculating step comprises using a time of arrival technique to calculate the location of the target.

9. The method of claim 1, wherein the calculating step comprises using a time difference of arrival technique to calculate the location of the target.

10. The method of claim 1, wherein the measuring step comprises transmitting a unique PN code from each base station.

11. The method of claim 1, wherein the measuring step comprises using a UWB signal with a chiprate between about 0.1 and about 10 Gbits.sec.

12. The method of claim 1, wherein the measuring step comprises using a DS-CDMA communication scheme.

13. The method of claim 1, wherein the measuring step comprises oversampling the received signal between about 0.3 and about 30 giga-samples/sec and wherein the measuring step comprises oversampling with a digital sampler or an analog-to-digital converter.

14. The method of claim 1 wherein the calculating step yields a location of the target with a resolution between about 0.01 and about 1.0 meter.

15. The method of claim 1, wherein the calculating step comprising performing a pseudo-inverse function on a matrix.

16. A method of determining the location of a target, comprising:
   initializing a plurality of base stations to determine their relative location to each other wherein, during initializing, a first base station of the plurality of base stations sends a UWB signal to a second base station and a third base station of the plurality of base stations to determine a distance between the first base station and the second base station and a distance between the first base station and the third base station and wherein the second base station sends a UWB signal to the third base station to determine a distance between the second base station and the third base station;
   measuring, at the target, the time of arrival of at least one UWB signal from each of the plurality of base stations;
   calculating directly the location of the target relative to the plurality of base stations, where the plurality of base stations is at least three when a time of arrival technique is used and wherein the plurality of base stations is at least four when a time difference of arrival technique is used wherein, for calculating the location of the target, the plurality of base stations creates a coordinate system with the first base station being an origin location, with the second base station being located on a first axis relative to the origin location and with the third base station being located on a second axis relative to the origin location.

17. The method of claim 16 wherein the coordinate system is set up on an ad hoc basis and is a local system entirely based upon relative distances between the plurality of base stations, the target or both.

18. The method of claim 16 wherein the plurality of base stations are non-line-of-sight relative to each other.

19. The method of claim 16 wherein the target calculates it own position.

20. The method of claim 16 wherein each of the base stations is a mobile base station.

21. The method of claim 16 further comprising initializing at least one of the plurality of base stations to determine the global geographic location of each of the plurality of base stations.

22. The method of claim 16 wherein the measuring and calculating steps are repeated at least 200 times a sec.

23. The method of claim 16 wherein the calculating step yields a location of the target with a resolution between about 0.01 and about 1.0 meter.

24. The method of claim 16 wherein the calculating step comprises performing a pseudo-inverse function on a matrix.

25. A method of determining the location of a target, comprising:

initializing a plurality of base stations to determine their relative location to each other wherein, during initializing, a first base station of the plurality of base stations sends a UWB signal to a second base station and a third base station of the plurality of base stations to determine a distance between the first base station and the second base station and a distance between the first base station and the third base station and wherein the second base station sends a UWB signal to the third base station to determine a distance between the second base station and the third base station;

measuring, at the target, the time of arrival of at least one UWB signal from each of the plurality of base stations;

calculating directly the location of the target relative to the plurality of base stations using a closed solution, where the plurality of base stations is at least three when a time of arrival technique is used and wherein the plurality of base stations is at least four when a time difference of arrival technique is used, wherein the calculating step uses a non-iterative technique to calculate the location of the target and wherein, for calculating the location of the target, the plurality of base stations creates a coordinate system with the first base station being an origin location, with the second base station being located on a first axis relative to the origin location and with the third base station being located on a second axis relative to the origin location and wherein the coordinate system is set up on an ad hoc basis and is a local system entirely based upon relative distances between the plurality of base stations, the target or both and wherein the plurality of base stations are non-line-of-sight relative to each other and wherein:

i. each of the base stations is a mobile base station;
ii. the measuring and calculating steps are repeated at least 200 times a sec;
iii. the calculating step yields a location of the target with a resolution between about 0.01 and about 1.0 meter.

26. The method of claim 1 wherein the location is determined using a closed solution and the calculating step uses a non-iterative technique to calculate the location of the target.

27. The method of claim 16 wherein the location is determined using a closed solution and the calculating step uses a non-iterative technique to calculate the location of the target.

* * * * *